United States Patent
Thompson et al.

(10) Patent No.: US 10,379,547 B2
(45) Date of Patent: Aug. 13, 2019

(54) SYSTEM AND METHOD FOR CALIBRATING A MATERIAL METERING SYSTEM

(71) Applicant: CNH Industrial Canada, Ltd., Saskatoon (CA)

(72) Inventors: Dennis George Thompson, Saskatoon (CA); Nicholas George Alfred Ryder, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 36 days.

(21) Appl. No.: 15/660,402

(22) Filed: Jul. 26, 2017

(65) Prior Publication Data
US 2019/0033895 A1   Jan. 31, 2019

(51) Int. Cl.
*G05D 7/06* (2006.01)
*A01C 15/00* (2006.01)
(Continued)

(52) U.S. Cl.
CPC .......... *G05D 7/0605* (2013.01); *A01C 7/107* (2013.01); *A01C 15/006* (2013.01); *A01C 7/08* (2013.01); *A01C 7/102* (2013.01); *B65D 88/26* (2013.01)

(58) Field of Classification Search
CPC .......... G05D 7/0605; G05D 7/06; G05D 7/00; A01C 15/006; A01C 15/005; A01C 15/00;
(Continued)

(56) References Cited

U.S. PATENT DOCUMENTS

| 3,723,989 A | 3/1973 | Fathauer et al. |
| 3,855,953 A | 12/1974 | Fathauer et al. |

(Continued)

FOREIGN PATENT DOCUMENTS

| CA | 2739149 | 5/2012 |
| CA | 2967676 | 5/2016 |
| EP | 0537857 A2 | 4/1993 |

OTHER PUBLICATIONS

"SeedMaster air drills and air carts are loaded with technology to get the crop in the ground more easily and efficiently."; Technology Central, SeedMaster, http://www.seedmaster.ca/techcentral.php, last accessed Jan. 17, 2017.

(Continued)

*Primary Examiner* — Christopher J. Novosad
(74) *Attorney, Agent, or Firm* — Rebecca L. Henkel; Rickard K. DeMille (57) ABSTRACT

A method for controlling a material flow rate from a metering system, includes determining, via a controller, a change in weight of material in a storage tank. The method further includes determining, via the controller, a swept area of an agricultural implement associated with the change in weight based at least in part on a width of the agricultural implement and a change in position of the agricultural implement. Further, the agricultural implement is configured to receive the material from the storage tank. The method also includes determining, via the controller, a calibration of the metering system based at least in part on the change in weight and the swept area. In addition, the method includes controlling, via the controller, a rotation rate of a meter roller of the metering system based at least in part on the calibration to control the material flow rate.

20 Claims, 5 Drawing Sheets

(51) Int. Cl.
*A01C 7/08* (2006.01)
*B65D 88/26* (2006.01)
*A01C 7/10* (2006.01)

(58) Field of Classification Search
CPC .. A01C 7/08; A01C 7/00; A01C 7/102; A01C 7/107; A01C 7/10; G65D 88/26; G65D 88/00
See application file for complete search history.

(56) References Cited

U.S. PATENT DOCUMENTS

| | | | |
|---|---|---|---|
| 3,912,121 A | 10/1975 | Steffen | |
| 4,288,160 A * | 9/1981 | Lodzinski | G01N 33/346 356/429 |
| 4,465,211 A | 8/1984 | van der Lely et al. | |
| 4,944,428 A | 7/1990 | Gmur et al. | |
| 5,025,951 A | 6/1991 | Hook et al. | |
| 5,323,721 A | 6/1994 | Tofte et al. | |
| 5,384,436 A | 1/1995 | Pritchard | |
| 5,574,657 A | 11/1996 | Tofte et al. | |
| 5,902,966 A | 5/1999 | VonMuenster | |
| 6,000,577 A | 12/1999 | Nystrom | |
| 6,091,997 A | 7/2000 | Flamme et al. | |
| 6,150,617 A | 11/2000 | Hart et al. | |
| 6,198,986 B1 | 3/2001 | McQuinn | |
| 6,534,728 B1 | 3/2003 | Spikings | |
| 6,584,920 B1 | 7/2003 | Cresswell | |
| 6,973,843 B2 | 12/2005 | Shyy et al. | |
| 7,171,913 B1 | 2/2007 | Conrad | |
| 7,357,087 B2 | 4/2008 | Wilson | |
| 7,765,944 B2 | 8/2010 | Wilson | |
| 8,078,367 B2 | 12/2011 | Sauder et al. | |
| 8,170,825 B2 | 5/2012 | Beaujot et al. | |
| 8,176,797 B2 | 5/2012 | Henry et al. | |
| 8,408,478 B2 | 4/2013 | Wonderlich | |
| 8,695,396 B2 | 4/2014 | Landphair et al. | |
| 8,825,310 B2 | 9/2014 | Kowalchuk | |
| 8,857,745 B2 | 10/2014 | Aral | |
| 9,043,949 B2 | 6/2015 | Liu et al. | |
| 2006/0255060 A1 | 11/2006 | Miller | |
| 2012/0053726 A1 * | 3/2012 | Peters | E04G 21/22 700/252 |
| 2012/0226461 A1 | 9/2012 | Kowalchuk | |
| 2012/0316673 A1 | 12/2012 | Riffel et al. | |
| 2013/0061790 A1 | 3/2013 | Binsirawanich et al. | |
| 2014/0302228 A1 | 10/2014 | Reineccius et al. | |
| 2018/0284735 A1 * | 10/2018 | Cella | G05B 23/024 |

OTHER PUBLICATIONS

Canadian Application No. 3,001,166, Submission Under Section 34.1 of the Patent Act, Jun. 12, 2019, 15 pgs.

* cited by examiner

SYSTEM AND METHOD FOR CALIBRATING A MATERIAL METERING SYSTEM

BACKGROUND

The present disclosure relates generally to a system and method for calibrating a material metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural materials (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver agricultural material (e.g., seeds, fertilizer, etc.) to the row units of the seeding implement. The air cart generally includes a storage tank (e.g., a pressurized tank), an air source (e.g., a blower), and a metering system. The material is typically gravity fed from the storage tank to the metering system which distributes a desired volume of material into an air stream generated by the air source. The air stream carries the material to the row units via conduits extending between the air cart and the seeding implement. The metering system typically includes meter rollers that regulate the flow of material based on meter roller geometry and rotation rate. There may exist an optimal amount of material distribution over a given area, which may depend, at least in part, on an operator's desired application rate. The amount of material distribution over a given area may be monitored and optimized by measuring the change in the weight of distributed material and the area over which the material has been distributed. Typically, meter rollers are calibrated to quantify the amount of agricultural material dispensed when rotating (e.g., pounds of agricultural material per rotation or per one hundred rotations) prior to starting seeding operations, but the calibration may not be accurate, which may result in less than optimal application rates and potentially reduced yields. It may be desirable to update the calibration of the meter rollers during a seeding operation.

BRIEF DESCRIPTION

In one embodiment, a method for controlling a material flow rate from a metering system, includes determining, via a controller, a change in weight of material in a storage tank. The method further includes determining, via the controller, a swept area of an agricultural implement associated with the change in weight based at least in part on a width of the agricultural implement and a change in position of the agricultural implement. Further, the agricultural implement is configured to receive the material from the storage tank. The method also includes determining, via the controller, a calibration of the metering system based at least in part on the change in weight and the swept area. In addition, the method includes controlling, via the controller, a rotation rate of a meter roller of the metering system based at least in part on the calibration to control the material flow rate.

In another embodiment, a controller includes a memory and a processor and the controller controls a material flow rate from a metering system. The controller further determines a change in weight of material in a storage tank. In addition, the controller determines a swept area of an agricultural implement associated with the change in weight based at least in part on a width of the agricultural implement and a change in position of the agricultural implement. Further, the agricultural implement is configured to receive the material from the storage tank. The controller also determines a calibration of the metering system based at least in part on the change in weight and the swept area. Moreover, the controller controls a rotation rate of a meter roller of the metering system, based at least in part on the calibration, to control the material flow rate.

In a further embodiment, one or more tangible, non-transitory, machine-readable media including instructions configured to cause a processor to control a material flow rate from a metering system. Moreover, the instructions are configured to cause a processor to determine a change in weight of material in a storage tank. In addition, the instructions are configured to cause a processor to determine a swept area of an agricultural implement associated with the change in weight based at least in part on a width of the agricultural implement and a change in position of the agricultural implement, and the agricultural implement is configured to receive the material from the storage tank. Further, the instructions are configured to cause a processor to determine a calibration of the metering system based at least in part on the change in weight and the swept area. Also, the instructions are configured to cause a processor to control a rotation rate of a meter roller of the metering system, based at least in part on the calibration, to control the material flow rate.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
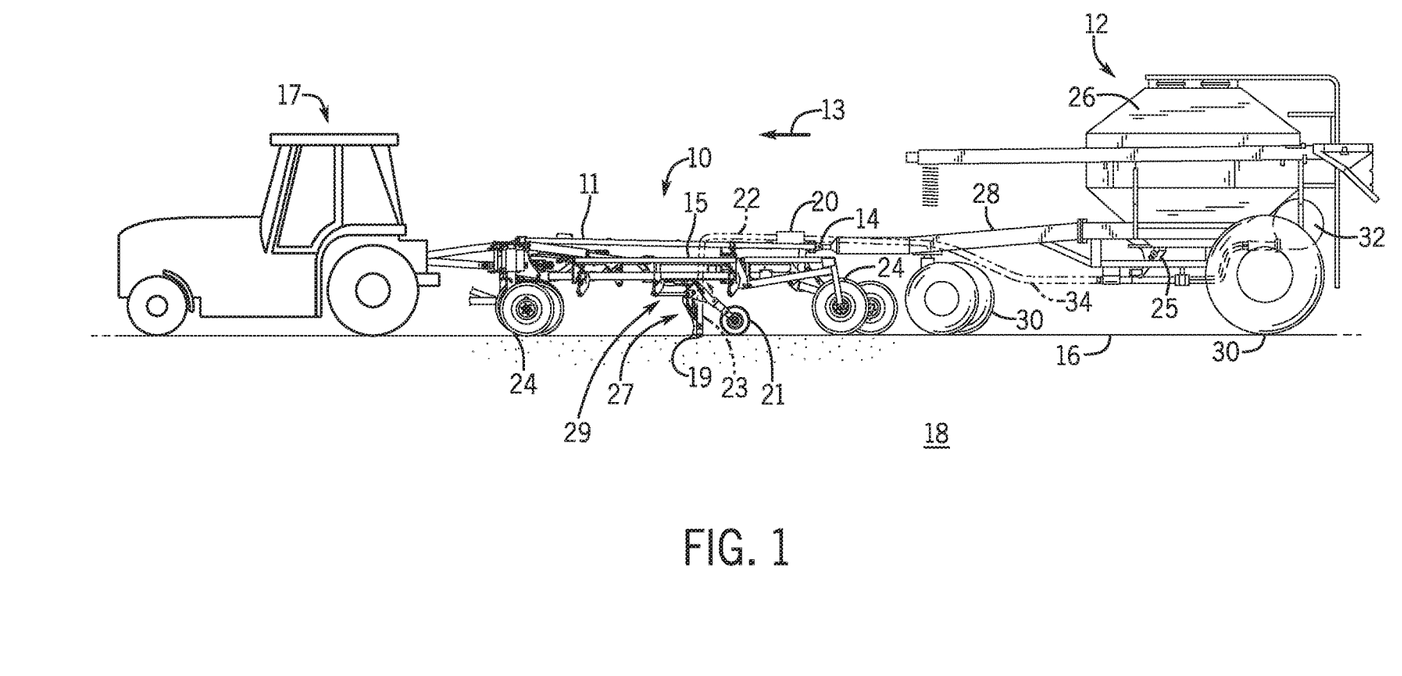
FIG. 1 is a side view of an embodiment of an air cart, including a metering system configured to provide a flow of particulate material.

Turning now to the drawings, FIG. 1 is a side view of an embodiment of an agricultural material application system 10. As depicted, the agricultural material application system 10 (e.g., a seeding system or a planter system) includes an agricultural implement 11 coupled to an air cart 12. In the depicted embodiment, the air cart 12 is towed behind the agricultural implement 11, relative to a direction of travel 13. In addition, the agricultural implement 11 is coupled to a work vehicle 17 by a first hitch system, and the air cart 12 is coupled to the agricultural implement 11 by a second hitch system 14. While the agricultural implement 11 is towed between the work vehicle 17 and the air cart 12 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled vehicle.

The agricultural implement 11 may deposit rows of seeds into the soil as the agricultural implement 11 is towed across a surface 16 of an agricultural field 18 by the work vehicle 17. The agricultural implement 11 includes a tool frame 15 coupled to a row unit 27 (e.g., a ground engaging opener system), a distribution header 20, a hose 22, and wheel assemblies 24. The wheel assemblies 24 may contact the surface 16 to enable the agricultural implement 11 to be towed by the work vehicle 17. As the agricultural implement 11 moves in the direction of travel 13, a row of seeds may be deposited into the soil by the row unit 27. Although only one row unit 27 is shown, the agricultural implement 11 may include multiple row units 27 organized in a row across a width of the agricultural implement 11. In some embodiments, the agricultural implement 11 may include a row of 12, 14, 16, 18, 20, or more row units 27, which may each deposit a respective row of seeds.

To facilitate depositing seeds, each row unit 27 includes an opener 19, a press wheel 21, a seed tube 23, and a hydraulic cylinder 29. When the opener 19 engages the soil, the opener 19 may exert a force that excavates a trench into the soil as the row unit 27 travels through the field. In the present embodiment, a position of the press wheel 21 controls the depth of the opener 19 and the hydraulic cylinder 29 controls the downward force (e.g., a down pressure). For example, the opener 19 may be controlled to establish a target the depth of the trench. Seeds may then be deposited into the excavated trench via the seed tube 23. Then, the press wheel 21 may facilitate movement of the excavated soil into the trench to cover the seeds and compress the soil covering the seeds.

The air cart 12 may centrally store seeds and distribute the seeds to the row unit 27. Accordingly, the air cart 12 includes an agricultural material meter 25, a storage tank 26, a frame 28, wheels 30, and an air source 32. In the depicted embodiment, the air cart frame 28 is coupled to the tool frame 15 via the hitch 14. The wheels 30 may contact the surface 16 to enable the air cart 12 to be towed along with the agricultural implement 11. Additionally, the storage tank 26 may centrally store the seeds for distribution. In some embodiments, the storage tank 26 may include multiple compartments for storing different types of granular materials. For example, a first compartment may store seeds while a second compartment may store a dry fertilizer. In such configurations, the air cart 12 may deliver both seed and fertilizer to the agricultural implement 11 via separate distribution systems, or as a mixture through a single distribution system.

Generally, the distribution system may control the amount of seeds distributed to the agricultural field 18, for example, using the agricultural material meter 25. For example, the agricultural material meter 25 may be controlled to increase or decrease the amount of seeds distributed to the agricultural field 18. As depicted, the agricultural material meter 25 is mounted to the bottom of the storage tank 26, which may enable the storage tank 26 to supply seeds to the agricultural material meter 25. The agricultural material meter 25 may then distribute the seeds to the distribution header 20 via a respective hose 34. The distribution headers 20 may then distribute the seeds to one or more row units 27 via the hose 22. In this manner, the agricultural material meter 25 may control distribution of seeds from the storage tank 26 to the row units 27 and into the trenches.

Before the agricultural implement 11 passes through the agricultural field 18, the agricultural material meter 25 is calibrated such that the agricultural material passes through the agricultural material meter 25 at a known rate. As discussed in detail below, this rate may change as the agricultural implement 11 passes through the agricultural field 18. Thus, the agricultural material meter 25 may be calibrated while the agricultural implement 11 passes through the agricultural field 18, which may contribute to increasing the yield.

Figure 2:
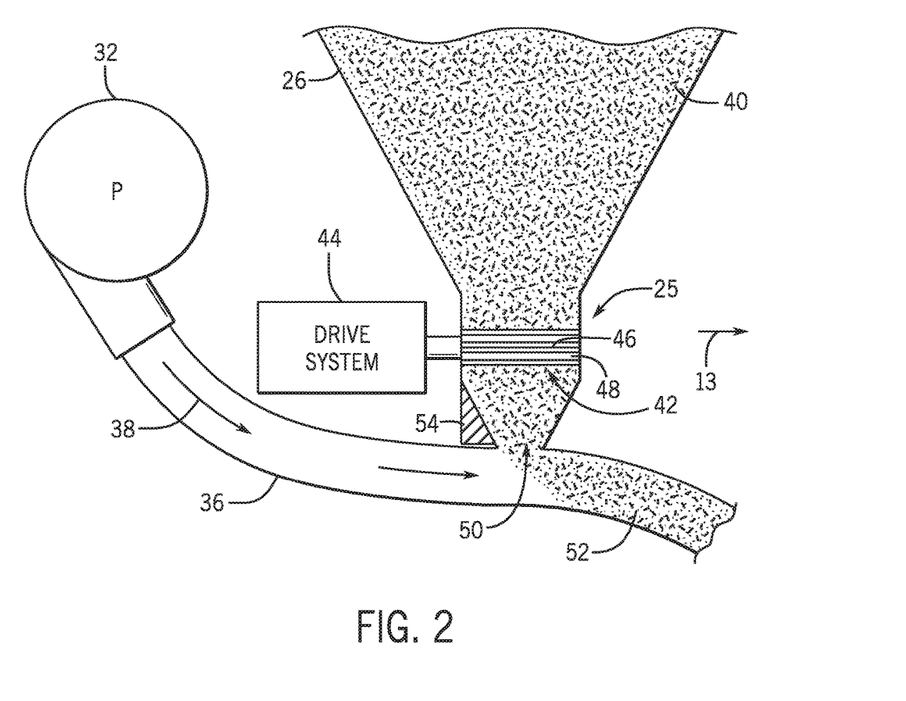
FIG. 2 is a schematic view of an embodiment of a metering system that may be employed within the air cart of FIG. 1.

FIG. 2 is a schematic view of the agricultural material meter 25, as shown in FIG. 1. As illustrated, the air source 32 is coupled to a conduit 36 configured to provide an air stream 38 past the agricultural material meter 25. The air source 32 may be a pump or blower powered by an electric or hydraulic motor, for example. Flowable particulate material 40 (e.g., seeds, fertilizer, etc.) within the storage tank 26 flows by gravity into the agricultural material meter 25. In certain embodiments, the storage tank 26 is pressurized such that a static pressure in the storage tank 26 is greater than a static pressure in the conduit 36, thereby facilitating an even flow of material through the agricultural material meter 25. The agricultural material meter 25 includes one or more meter rollers 42 (e.g., rotatable metering devices) configured to regulate the flow of material 40 into the air stream 38. For example, certain agricultural material meters 25 may include twelve meter rollers 42, each may be disposed within an independent housing and each configured to flow particulate material into a respective conduit 36 for distribution to one or more respective row units of the agricultural implement. Such metering systems are known as "12-run" metering systems. However, in alternative embodiments, the agricultural material meter 25 may include more or fewer meter rollers, e.g., 1, 2, 3, 4, 5, 6, 7, 8, 9, 10, 11, 13, or more.

In the illustrated embodiment, the meter roller 42 is coupled to a drive system 44 configured to drive the meter roller 42 to rotate. In certain embodiments, the drive system 44 may include a drive unit, such as an electric or hydraulic motor, configured to drive one or more meter rollers to rotate. In further embodiments, the drive system 44 may be coupled to a wheel (e.g., via a gear system) such that rotation of the wheel drives the meter roller 42 to rotate. Such a configuration automatically varies the rotation rate of the meter roller 42 based on the speed of the air cart.

The meter roller 42 also includes protrusions, such as the illustrated flutes 46, and recesses 48. Each respective recess 48 is disposed between a respective pair of flutes 46. As the meter roller 42 rotates, the respective pair of flutes 46 moves the material 40 (e.g., agricultural material) disposed within the respective recess 48 downwardly, thereby transferring the material 40 to the conduit 36. The number and geometry of the flutes 46 are particularly configured to accommodate the material 40 being distributed. Certain meter rollers 42 may include six flutes 46 and a corresponding number of recesses 48. Alternative meter rollers may include more or fewer flutes 46 and/or recesses 48. For example, the meter roller 42 may include 2, 4, 6, 8, 10, 12, 14, 16, 18, 20, or more flutes 46 and/or recesses 48. In addition, the depth of the recesses 48 and/or the height of the flutes 46 are configured to accommodate the material 40 within the storage tank 26. For example, a meter roller having deeper recesses 48 and fewer flutes 46 may be employed for larger seeds, while a meter roller having shallower recesses 48 and more flutes 46 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 40. While the illustrated meter roller includes flutes, it should be appreciated that in alternative embodiments, the meter roller may include other protrusions, and/or the recesses may be omitted.

In the illustrated embodiment, the meter roller 42 is oriented substantially parallel to the direction of travel 13 of the air cart. As used herein, substantially parallel may refer to an angle of about 0 to 45 degrees, about 0 to 30 degrees, about 0 to 15 degrees, about 0 to 5 degrees, or about 0 to 1 degree relative to an axis/direction (e.g., the direction of travel 13). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration, the rotation rate of the meter roller 42 controls the flow of material 40 into the air stream 38. For example, as the meter roller 42 rotates, the meter roller transfers material through an opening 50 in the agricultural material meter 25 into the respective conduit 36 (e.g., into a conduit associated with a respective row unit or group of row units). The material then mixes with air from the air source 32, thereby forming an air/material mixture 52. The mixture then flows to the respective row unit(s) of the implement via pneumatic conduits, where the seeds and/or fertilizer are deposited within the soil. As the material 40 exits the storage tank 26, the total weight of the material 40 in the storage tank 26 decreases. A scale 54 may be utilized to measure this change in weight. As discussed in detail below, the change in weight, along with other information, may enable a controller to determine a calibration more accurately than a pre-seeding calibration process, thereby depositing a target amount of product to the field, which may increase the yield. Further, although the scale 54 is depicted at the bottom of the storage tank 26, the scale 54 may be disposed in other locations along the air cart, including on the frame of the air cart, along the suspension of the air cart, inside the storage tank 26, or any other suitable location in the air cart. Further, the scale 54 may include any device capable of measuring a weight. Further, any number of scales 54 may be utilized, including 1, 2, 3, 4, 5, 6, or more.

Figure 3:
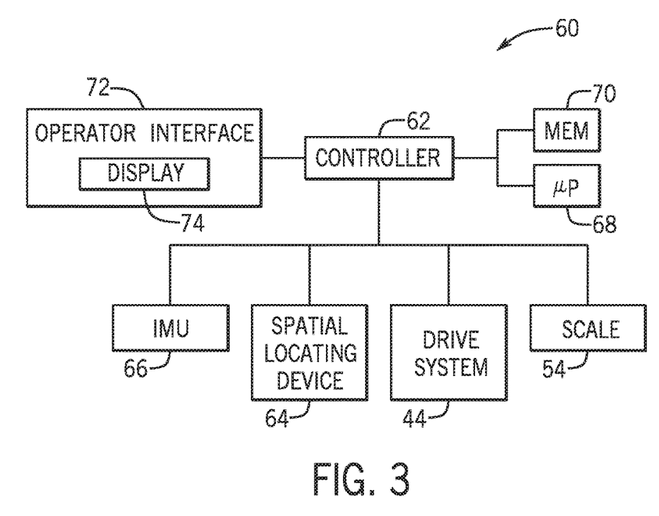
FIG. 3 of a block diagram of an embodiment of a control system for controlling a flow of particulate material through a metering system.

FIG. 3 is a block diagram of an embodiment of a control system 60 for controlling the flow of the material through the agricultural material meter 25. In the present embodiment, the control system 60 includes a controller 62 that is in communication with a spatial locating device 64 (e.g., global positioning system (GPS), speedometer, or odometer), an inertial measurement unit (IMU) 66 (e.g., accelerometer, gyroscope, or both), the drive system 44, the scale 54, a processor 68, a memory device 70, and an operator interface 72.

The spatial locating device 64 may include one or more spatial locating antennas and each is communicatively coupled to the spatial locating device 64. Each spatial locating antenna is configured to receive spatial locating signals (e.g., GPS signals from GPS satellites) and to output corresponding spatial locating data to the spatial locating device 64. The spatial locating device 64 is configured to determine the position of each spatial locating antenna (e.g., based at least in part on the spatial locating signals). The spatial locating device 64 and/or the controller 62 is configured to determine the orientation of the agricultural material application system based at least in part on the position of each spatial locating antenna. Increasing the lateral separation distance between the spatial locating antennas may increase the accuracy of the vehicle orientation determination.

In certain embodiments, the control system 60 also includes the IMU 66 communicatively coupled to the controller 62 and configured to enhance the accuracy of the determined position and/or orientation. For example, the IMU 66 may include one or more accelerometers configured to output signal(s) indicative of acceleration along the longitudinal axis, the lateral axis, the vertical axis, or a combination thereof. In addition, the IMU 66 may include one or more gyroscopes configured to output signal(s) indicative of rotation (e.g., rotational angle, rotational velocity, rotational acceleration, etc.) about the longitudinal axis, the lateral axis, the vertical axis, or a combination thereof. The controller 62 may determine the position and/or orientation of the agricultural vehicle based on the IMU 66 signal(s) while the spatial locating signals received by the spatial locating antennas are insufficient to facilitate position determination (e.g., while an obstruction, such as a tree or building, blocks the spatial locating signals from reaching the spatial locating antennas). In addition, the controller 62 may utilize the IMU 66 signal(s) to enhance the accuracy of the determined position and/or orientation. For example, the controller 62 may combine the IMU 66 signal(s) with the spatial locating data and/or the position determined by the spatial locating device 64 (e.g., via Kalman filtering, least squares fitting, etc.) to determine a more accurate position and/or orientation of the agricultural vehicle (e.g., by compensating for movement of the spatial locating antennas resulting from pitch and/or roll of the agricultural vehicle as the agricultural vehicle traverses uneven terrain).

In certain embodiments, the IMU 66 and the spatial locating device 64 may be disposed within a common housing. In further embodiments, the IMU 66 and one spatial locating antenna may be disposed within a common housing. For example, each spatial locating antenna housing may include a spatial locating antenna and an IMU 66. Furthermore, in certain embodiments, a portion of the spatial locating device 64 and one spatial locating antenna may be disposed within a common housing. For example, a first portion of the spatial locating device 64 and the first spatial locating antenna may be disposed within a first housing, and a second portion of the spatial locating device 64 and the second spatial locating antenna may be disposed within a second housing. In certain embodiments, a first IMU 66 may be disposed within the first housing, and a second IMU 66 may be disposed within the second housing.

The operator interface 72 is configured to present data to an operator (e.g., data associated with operation of the agricultural material application system). The operator interface 72 is also configured to enable an operator to control certain functions of the agricultural material application system (e.g., starting and stopping the agricultural material application system, adjusting the speed of the drive assembly 44, etc.). In the illustrated embodiment, the operator interface 72 includes a display 74 configured to present information to the operator, such as the position of the agricultural material application system within the field, the speed of the agricultural product application system, the path of the agricultural product application system, the weight of the storage tank, the seeding rate, the area seeded by the agricultural material application system, among other data.

Before the agricultural material application system disperses the material in the field, an initial speed of the drive assembly 44 is set. The initial speed may be based off a previous seeding operation. For example, at the end of a previous seeding operation, the controller 62 may have determined a certain speed of the drive assembly 44 correlated to a certain rate of material deposition. In other embodiments, the initial speed may be based off a manual calibration of the drive assembly 44. For example, an operator or controller 62, may turn the drive assembly 44 one turn and measure the amount of material deposited by the single turn of the drive assembly 44. This process may be repeated as many times as the operator desires, or once the controller 62 determines an acceptable average. Then, the controller 62 may set an initial speed of the drive assembly 44 based on the measured weight of material deposited per turn of the drive assembly.

The controller 62 may receive signals from the spatial locating device 64, the IMU 66, and the scale 54, to control the speed of the drive system 44 based on the received signals. For example, the spatial locating device 64 may monitor the position of the agricultural implement 11 and communicate the position to the controller 62. The controller 62 may receive an input (e.g., from an operator) indicative of the width of the agricultural implement 11 and another input relating to the position of the agricultural implement 11 when the material begins being distributed into the ground. In some embodiments, the controller 62 may store the initial position automatically. Utilizing these inputs, the controller 62 may determine the area swept by the agricultural implement 11 (i.e., swept area). Further, in certain embodiments, the material may be distributed through a portion of the width of the agricultural implement. In these embodiments, the controller 62 may utilize the portion of the width of the agricultural implement through which the material is distributed, when the controller 62 determines the swept area. Further, the portion of the width of the agricultural implement through which the material is distributed may be controlled by which row units or groups of row units are dispensing material. The row units or groups of row units may start and stop dispensing material between an initial weight measurement and an in-field weight measurement.

The controller 62 also receives a signal indicative of the weight of material that has been distributed through the agricultural implement 11. In the present embodiment, the scale 54 measures the weight of the storage tank. The scale 54 measures the weight of the storage tank before any of the material exits the storage tank and send a signal to the controller 62 indicative of the initial weight of the storage tank. As the material exits the storage tank, the weight of the storage tank decreases. The scale 54 measures this change in weight, which is the weight of material that has been distributed through the agricultural implement. The scale 54 then outputs the signal indicative of the weight. The change in weight may be small relative to the overall weight of the storage tank. Because fields are normally not flat, bumps in the field can cause the air cart to fluctuate in measured weight (e.g., weight measured by the scale 54). As such, accuracy of the weight measurement may be enhanced by removing the effects of the bumps from the measurements of the scale 54. For example, the tow vehicle may come to a stop, or substantially close to a stop, so that the air cart stops passing over bumps before a weight measurement is taken. After the air cart has stopped, the scale 54 may take a measurement of the weight of the storage tank and send a signal to the controller 62. By way of example, the tow vehicle may come to a stop after the agricultural implement has covered a certain area (e.g., 0.5 to 100 acres, 1 to 20 acres, 1 to 5 acres, etc.).

In other embodiments, the IMU 66 may be utilized to filter out the bumps, enabling the scale 54 to take measurements while the air cart 12 is in motion. Prior to the work vehicle 17 moving, the IMU 66 may first measure the constant force caused by gravity (e.g., a gravitational force measured in 'g' forces). Using this measurement as a baseline, the IMU 66 may continuously, or near continuously by taking measurements at a time interval, measure a change in force caused by outside influences (e.g., the bumps in the field).

The force data from the IMU 66 and the weight data from the scale 54 can be combined to filter out the changes in weight caused by the outside forces. For example, the measured weight of the storage tank is the product of the outside forces and the actual weight of the storage tank. Further, when the storage tank is at rest, the only outside force acting on the storage tank is the acceleration due to gravity. As discussed above, the IMU 66 may measure the outside forces as a percent change in the acceleration due to gravity (e.g., the 'g' force). Thus, the actual weight of the storage tank may simply be calculated by dividing the weight data from the scale 54 by the force data from the IMU 66. For example, when the air cart 12 passes over a bump, the force may increase upon hitting the bump, decrease upon clearing the bump, then increase again upon hitting the ground after the bump. The IMU 66 may measure these changes in the force acting on the air cart 12. While the IMU 66 is measuring the forces, the scale 54 may measure the weight of the air cart 12 for the same time period. Then, the controller 60 may receive the data from the IMU 66 and the scale 54, and perform the determination, as discussed above to calculate the actual weight of the storage tank. This allows the change in weight of the material to be continuously, or near continuously, measured, even as the air cart 12 moves through the field. This process of filtering the outside forces increases the accuracy of weight measurements, thereby increasing accuracy of calibration such that the material is dispersed at a target rate.

In other embodiments, the filtering may be done by increasing the total number of measurements without using data from the IMU 66. In particular, the effects of the bumps in the field tend to cancel themselves out over time. Thus, as the time is increased, the effects of the bumps approach zero.

Further, the controller 62 may receive the data from the IMU 66 and determine which parts of the field are flatter. Flatter portions of the field correspond to lower outside forces. Thus, choosing the portions of the force data that deviate the least from the constant force caused by gravity corresponds to data received from flatter portions of the field. Then, the controller 62 may select weight data corresponding to the flatter portions of the field, and use this data for the above discussed calibration determination.

After the swept area and the change in weight of the material has been determined (i.e., the difference between the initial weight measurement and a weight measurement after a portion of the material has been dispersed in the field), the controller 62 determines the amount (e.g., weight) of material deposited per area. Some or all of the data (i.e., the force data from the IMU 66, the weight data from the scale 54, the change in weight, the current measured weight, the initial measured weight, etc.) may be presented to an operator (e.g., via a display in the work vehicle 17). After the controller 62 determines the amount of material deposited per area, the controller 62 or the operator may compare the calibration to a target calibration. For example, if the amount of material deposited per area is outside of a threshold value, the controller 62 or the operator may adjust the meter roller rotation rate to bring the amount of material deposited per area closer to a target value. The threshold value may be measured as a percent difference from the target value and could include a value of 5 percent, 7 percent, 10 percent, 15 percent, or any other percentage. Further, the threshold value may be measured as a difference between the target amount of material deposited per area and the measured amount of material deposited per area, and may include any suitable number. The operator may compare the calibration based on the data presented via the operator interface, and the controller may compare the calibration automatically.

The calibration process may update the amount of material deposited per area to match either the operator input or the controller input. For example, the controller 62 may adjust the speed of the drive system 44, and thus the meter rollers, such that the determined amount of material deposited per area approaches or matches the target amount of material deposited per area. The increase or decrease in speed of the meter rollers may match the percent increase or decrease from determined amount of material deposited per area to the target amount of material deposited per area. For example, in some embodiments, if the operator inputs a 10% increase in the amount of material deposited, the controller 62 may increase the speed of the drive system 44 by 10%. In other embodiments, the corresponding change may be nonlinear. For example, the corresponding change may be based on an empirical table, on a table of corresponding values, etc.

Further, the controller 62 may include the processor 68 and the memory device 70. The processor 68 and memory device 70 may be part of the controller 62, or may be separate from the controller 62. Moreover, the processor 68 may include multiple microprocessors, one or more "general-purpose" microprocessors, one or more special-purpose microprocessors, and/or one or more application specific integrated circuits (ASICS), or some combination thereof. For example, the processor 68 may include one or more reduced instruction set (RISC) processors. The controller 62 may include the memory device 70 that may store information such as control software, look up tables, configuration data, etc.

The memory device 70 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). The memory device 70 may store a variety of information, which may be suitable for various purposes. For example, the memory device 70 may store machine-readable and/or processor-executable instructions (e.g., firmware or software) for the processor execution.

Figure 4:
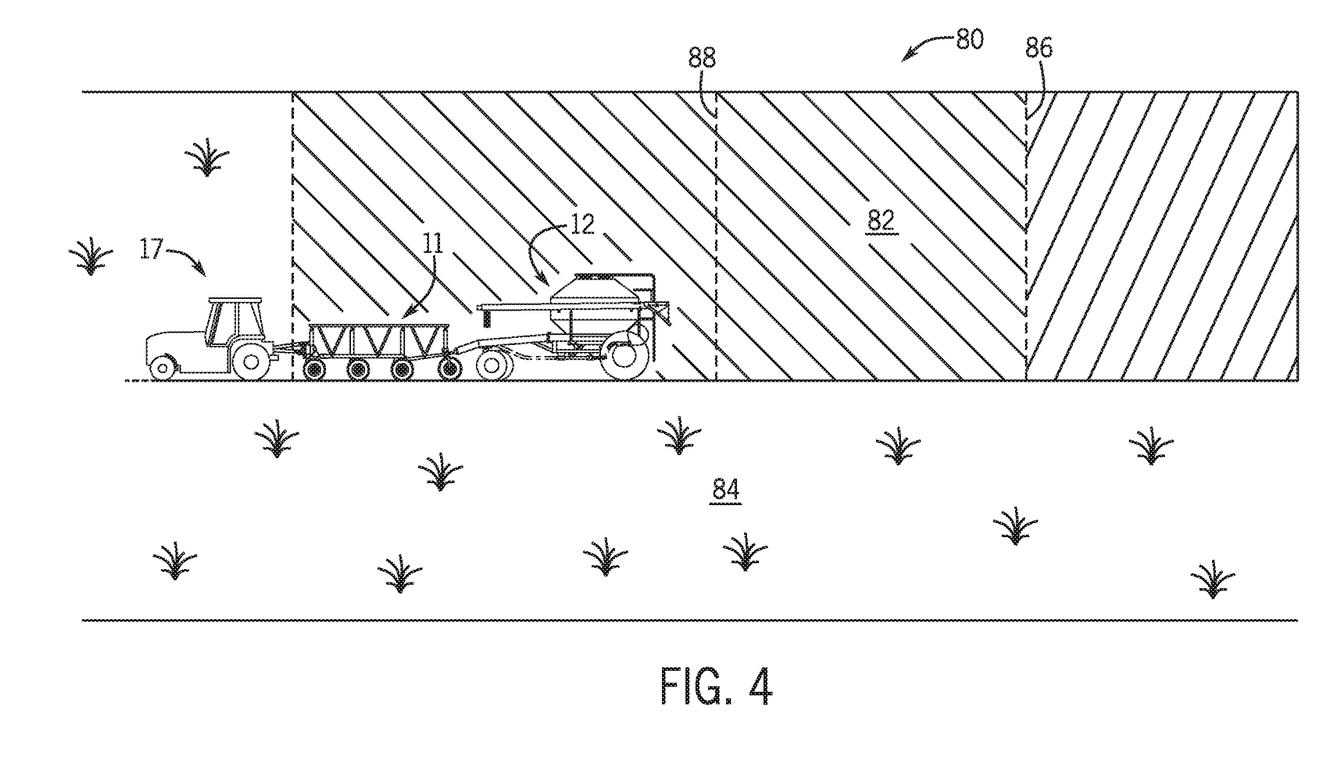
FIG. 4 is a perspective view of an embodiment of a seeding system travelling through a field.

FIG. 4 is a top view of an embodiment of the seeding system 10 travelling through a field 80. The agricultural implement 11 has covered a planted portion 82 of the field, but has yet to cover an unplanted portion 84. In some embodiments, the seeding system 10 may stop at multiple points while travelling through the field in order to measure the weight of the storage tank. In some embodiments, the controller may instruct the work vehicle 17 to stop via a signal or an ISOBUS class 3 connection between the air cart 12 and the work vehicle 17. For example, the seeding system 10 may stop at point 86 or 88. After coming to a stop, the control system may update the speed of the drive system to achieve a target amount of material deposited per area, as discussed above. The seeding system 10 may stop as often as instructed. Thus, the points 86 and 88 may be farther or closer to one another than depicted in the present embodiment. For example, the operator of the work vehicle 17 may desire to execute the calibration process more frequently, and stop more often and/or in shorter intervals, or the operator may not stop at any point in the field 80 and not execute the calibration process after the seeding system 10 has begun depositing material in the field 80. Further, in some embodiments, the seeding system 10 may not stop at any point in the field 80, and the control system may still execute the calibration process. For example, as discussed above, the control system may include the IMU to enable periodic execution of the calibration process while the seeding system 10 is moving.

Figure 5:
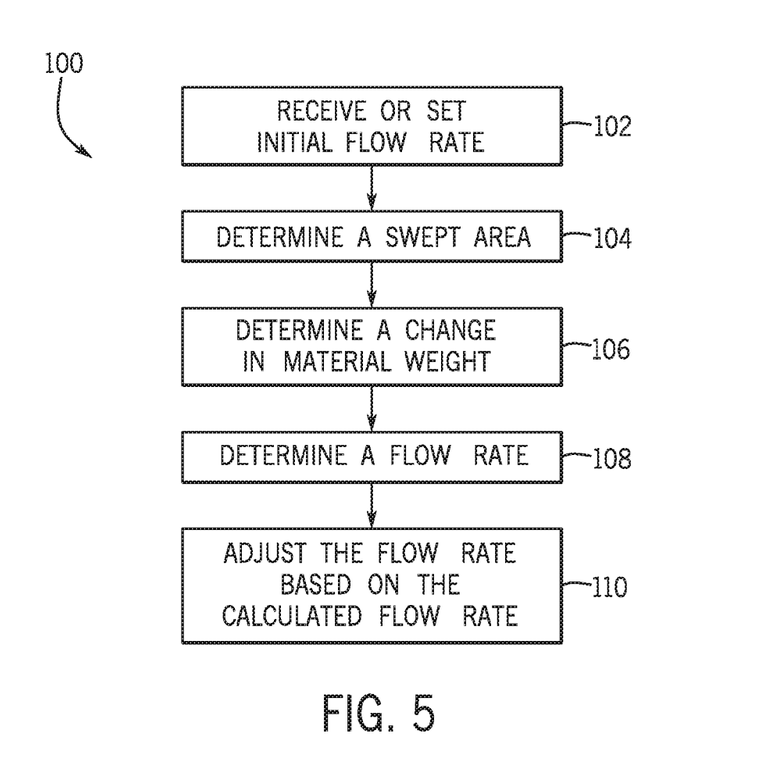
FIG. 5 is a flow chart of an embodiment of a process for calibrating a flow of particulate material.

FIG. 5 is a flow chart illustrating an embodiment of a process 100 for calibrating the flow of material. Although the following process 100 describes a number of operations that may be performed, it should be noted that the process 100 may be performed in a variety of suitable orders, and each of the operations of the process 100 may not be performed. Further, each of the operations of the process 100 may be carried out by the control system.

The process 100 receives and sets (block 102) an initial flow rate. As discussed above, the flow rate is determined by the speed of the drive system. Thus, the controller may control the speed of the drive system to establish an initial flow rate. In some embodiments, the controller may receive a flow rate, and then control the speed of the drive system in accordance with the received flow rate. For example, if the controller has a calibration from a previous session (e.g., a previous seeding operation), then the controller may utilize the calibration from the previous session for the current seeding operation. In other embodiments, other methods may be utilized to control the flow rate. For example, the meter rollers may be turned, either manually or by the drive system, a number of times. Then the amount of material deposited by the meter rollers may be weighed so that an amount of material per turn of the meter roller may be determined. This amount of material per turn may then be used by the controller to establish an initial flow rate. In another embodiment, an initial flow rate may be input in the controller (e.g., by an operator via the operator interface). The initial flow rate may be based on prior data collected by either a manufacturer or an operator.

After setting (block 102) the initial flow rate, the process 100 determines (block 104) a swept area. As discussed above, the swept area is an area that the agricultural implement passes over and distributes seeds. For example, if a portion of the width of the agricultural implement deposits seeds, then only the portion of the width of the agricultural implement is considered when determining the swept area. As discussed above, the seeding system may cover any suitable swept area for the process 100 to be performed.

Next, the process 100 determines (block 106) a change in the material weight in the air cart. As discussed above, this may be accomplished by utilizing a scale to measure the change in weight of the air cart, and using that change in weight as the amount of material deposited by the seeding system in the swept area. Further, as discussed above, the scale may take measurements when the air cart is stationary or in motion. In embodiments in which the scale takes measurements while the air car is in motion, the filtering technique described above may be utilized.

Then, the process 100 determines (block 108) a flow rate of the material based on the determined (block 106) change in material weight in the storage tank and the determined (block 104) swept area.

After determining (block 108) the flow rate of the material, the process 100 may then adjust (block 110) the flow rate based on the determined flow rate. As discussed above, the controller may compare the determined flow rate to a target flow rate to determine how much the flow rate should change to match the target flow rate. Then, the controller may adjust the speed of the drive system in accordance with the difference between the determined flow rate and the target flow rate, as discussed above.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method for controlling a material flow rate from a metering system, comprising:
determining, via a controller, a change in weight of material in a storage tank;
determining, via the controller, a swept area of an agricultural implement associated with the change in weight based at least in part on a width of the agricultural implement and a change in position of the agricultural implement, wherein the agricultural implement is configured to receive the material from the storage tank;
determining, via the controller, a calibration of the metering system based at least in part on the change in weight and the swept area; and
controlling, via the controller, a rotation rate of a meter roller of the metering system based at least in part on the calibration to control the material flow rate.

2. The method of claim 1, comprising:
receiving, via the controller, a first signal indicative of an initial weight; and
receiving, via the controller, a second signal indicative of a weight after covering the swept area, wherein determining the change in weight is based on the first signal and the second signal.

3. The method of claim 2, comprising receiving, via the controller, the first signal and the second signal when the storage tank is stopped.

4. The method of claim 3, comprising outputting, via the controller, a third signal indicative of not covering a minimum swept area if the swept area is less than one acre.

5. The method of claim 1, comprising receiving, via the controller, a signal indicative of an acceleration of the storage tank, and determining, via the controller a change in weight based on the acceleration.

6. The method of claim 5, comprising determining, via the controller, a baseline force caused by gravity.

7. The method of claim 1, updating, via the controller, an initial calibration with the calibration, wherein the initial calibration is determined by rotating a meter roller a number of times, and determining an amount of weight of material deposited.

8. The method of claim 1, comprising setting, via the controller, an initial flow rate based on an amount of material deposited per rotation of a meter roller.

9. The method of claim 1, comprising determining, via the controller, an output, wherein the output is the weight of material divided by the swept area.

10. A controller comprising a memory and a processor, wherein the controller is configured to:
control a material flow rate from a metering system;
determine a change in weight of material in a storage tank;
determine a swept area of an agricultural implement associated with the change in weight based at least in part on a width of the agricultural implement and a change in position of the agricultural implement, wherein the agricultural implement is configured to receive the material from the storage tank;
determine a calibration of the metering system based at least in part on the change in weight and the swept area; and
control a rotation rate of a meter roller of the metering system based at least in part on the calibration to control the material flow rate.

11. The method of claim 10, wherein the controller is configured to:
receive a first signal indicative of an initial weight; and
receive a second signal indicative of a weight after covering the swept area, wherein determining the change in weight is based on the first signal and the second signal.

12. The method of claim 11, wherein the controller is configured to receive the first signal and the second signal when the storage tank is stopped.

13. The method of claim 12, wherein the controller is configured to output a third signal indicative of not covering a minimum swept area if the swept area is less than one acre.

14. The method of claim 10, wherein the controller is configured to update an initial calibration with the calibration, wherein the initial calibration is determined by rotating a meter roller a number of times, and determining an amount of weight of material deposited.

15. The method of claim 10, wherein the controller is configured to determine an output, wherein the output is the weight of material divided by the swept area.

16. One or more non-transitory, machine-readable media comprising instructions configured to cause a processor to:
control a material flow rate from a metering system;

determine a change in weight of material in a storage tank;

determine a swept area of an agricultural implement associated with the change in weight based at least in part on a width of the agricultural implement and a change in position of the agricultural implement, wherein the agricultural implement is configured to receive the material from the storage tank;

determine a calibration of the metering system based at least in part on the change in weight and the swept area; and control a rotation rate of a meter roller of the metering system based at least in part on the calibration to control the material flow rate.

17. The one or more non-transitory, machine-readable media comprising instructions of claim 16, wherein the instructions are configured to cause a processor to receive a first signal indicative of an initial weight; and receive a second signal indicative of a weight after covering the swept area, wherein determining the change in weight is based on the first signal and the second signal.

18. The one or more non-transitory, machine-readable media comprising instructions of claim 17, wherein the instructions are configured to cause a processor to receive the first signal and the second signal when the storage tank is stopped.

19. The one or more non-transitory, machine-readable media comprising instructions of claim 17, wherein the instructions are configured to cause a processor to determine an output, wherein the output is the weight of material divided by the swept area.

20. The one or more non-transitory, machine-readable media comprising instructions of claim 16, wherein the instructions are configured to cause a processor to output a third signal indicative of not covering a minimum swept area if the swept area is less than one acre.

* * * * *